United States Patent [19]

Hartley

[11] Patent Number: 5,649,128
[45] Date of Patent: Jul. 15, 1997

[54] MULTIPLE BUS INTERFACE ADAPTER FOR CONNECTION TO A PLURALITY OF COMPUTER BUS ARCHITECTURES

[75] Inventor: Lee F. Hartley, Toronto, Canada

[73] Assignee: International Business Machines Corporation, Armonk, N.Y.

[21] Appl. No.: 332,962

[22] Filed: Nov. 1, 1994

[30] Foreign Application Priority Data

Nov. 22, 1993 [CA] Canada .................................. 2109682

[51] Int. Cl.[6] .................................................. G06F 13/40
[52] U.S. Cl. ................................... 395/309; 395/883
[58] Field of Search ................................. 395/306, 308, 395/309, 310, 883, 282

[56] References Cited

U.S. PATENT DOCUMENTS

| | | | |
|---|---|---|---|
| 5,025,412 | 6/1991 | Dalrymple et al. | 395/883 |
| 5,191,653 | 3/1993 | Banks et al. | 395/309 X |
| 5,191,657 | 3/1993 | Ludwig et al. | 395/306 X |
| 5,218,690 | 6/1993 | Boioli et al. | 395/500 |
| 5,287,460 | 2/1994 | Olsen et al. | 395/883 |
| 5,414,820 | 5/1995 | McFarland et al. | 395/309 X |
| 5,428,751 | 6/1995 | Dollinger et al. | 395/309 |
| 5,432,949 | 7/1995 | Baba | 395/800 |
| 5,434,997 | 7/1995 | Landry et al. | 395/306 X |
| 5,452,420 | 9/1995 | Engdahl et al. | 395/309 X |

*Primary Examiner*—Glenn A. Auve
*Attorney, Agent, or Firm*—Brian F. Russell; Andrew J. Dillon

[57] ABSTRACT

A multiple bus interface is provided for connection to the bus of a data processing device. It includes a common interface adapted for connection to any one of several bus architectures for operation therewith. The interface adapter includes a control interface for accepting control signals from the bus of said data processing device, an address interface for accepting address signals from the data processing device, and a data interface for accepting data signals from said data processing device. A bus identifier is provided for identifying the bus architecture of the data processing device as will as a bus protocol decoder responsive to the bus identifier. The decoder derives its input from the control interface and is adapted to produce as an output standardized local control signals derived from the data processing bus control signals for sue by a local functional device to be accessed by the data processing device.

17 Claims, 11 Drawing Sheets

MULTIPLE BUS INTERFACE ADAPTER FOR CONNECTION TO A PLURALITY OF COMPUTER BUS ARCHITECTURES

BACKGROUND OF THE INVENTION

1. Technical Field

The present invention relates to personal computers and more particularly to the implementation of adapter cards that can be used to connect to computers with different bus architectures with a single bus of a desired architecture.

2. Description of the Related Art

The IBM® personal computer family was established as a standard which has been adopted by thousands of computer companies. Following from the inception of the first personal computer which used the PC bus, the personal computer AT was subsequently introduced by IBM and used a slightly different architecture called the AT architecture. This architecture has been used in the IBM Personal Computer AT, the IBM Personal Computer model 25, and 30, and other IBM computers and the personal computers produced by many companies worldwide. The AT bus has been accepted as the ISA standard for personal computers. Subsequent to the introduction of the AT, architecture IBM introduced the microchannel architecture, or the Micro Channel Bus as it is normally called. This bus was used in the IBM PS/2® Models 50, 55, 60, 70, 80, 90, 95, among others and in computers made by other companies. Subsequent to the development architecture, advances were made in miniaturization of electronic circuits and memory such that it became possible to store tremendous amounts of data in a small format and the PCMCIA architecture was born. Other architectures have been developed such as the EISA architecture, the PCI Architecture and the VESA architecture. Different architectures have evolved in response to the evolution of computer microprocessor capabilities.

To provide flexibility in the design of accessory boards for different bus architecture it would be desirable if a single integrated circuit could accommodate any of these bus architectures so that for instance an Infrared communications adaptor could be constructed for an AT, MCA or PCMCIA bus using the same integrated circuit. This would reduce the need for the development for ICs for each bus.

SUMMARY OF THE INVENTION

The present invention provides a circuit, for instance a module or integrated circuit, that can be used to connect systems with different architectures to a common expansion option.

Basically this invention provides a circuit which transforms signals conveyed on any of a number of architectural busses into a standardized bus protocol to be used locally on an adapter card or module to provide a bus connection for a functional device, such as a display driver on the adapter card.

One aspect of the invention provides a multiple bus interface adapter, or module for connection to the bus of a data processing device. The adapter includes a common interface or group of lines for connection to any of several bus architectures for operation therewith. The interface adapter includes:

(a) a control interface for accepting control signals from the bus of the data processing device, (b) an address interface for accepting address signals from the data processing device, and (c) a data interface for accepting data signals from said data processing device.

A bus identifier is provided for identifying the bus architecture of the data processing device, as well as a bus protocol decoder responsive to the bus identifier.

The decoder derives its input from the control interface, and is adapted to produce as an output standardized local control signals derived from the data processing bus control signals for use by a local functional device to be accessed by the data processing device.

The interface can be bidirectional depending on architectural and functional requirements.

The bus protocol decoder advantageously can be responsive to the bus identifier to derive protocol specific control signals from control signals from the control interface.

Also, address capture logic coupled to the address interface using transparent latches enabled by control signals from the control interface can be used to provide a standardized local address for the local functional device.

In addition, local functional enable logic responsive to the standardized local address can provide an activation signal to the local functional device.

The local functional enable logic can provide feedback to the data processing device.

The feedback can include acknowledgment of receipt of the standardized local address and a corresponding standardized local control signal.

The acknowledgment (signal) can include an acknowledgment signal from the local functional device signifying completion of the function initiated by the standardized local control and address signals.

The bus identifier can convey bus identification to the local functional device.

The above as well as additional objectives, features, and advantages of the present invention will become apparent in the following detailed written description.

BRIEF DESCRIPTION OF THE DRAWINGS

A better understanding of the present invention can be had by reference to the following detailed description of an embodiment of the invention in conjunction with the following drawings in which;

FIGS. 2a–2e are a representation of bus protocol decoder logic.

DETAILED DESCRIPTION OF PREFERRED EMBODIMENT

Figure 1:
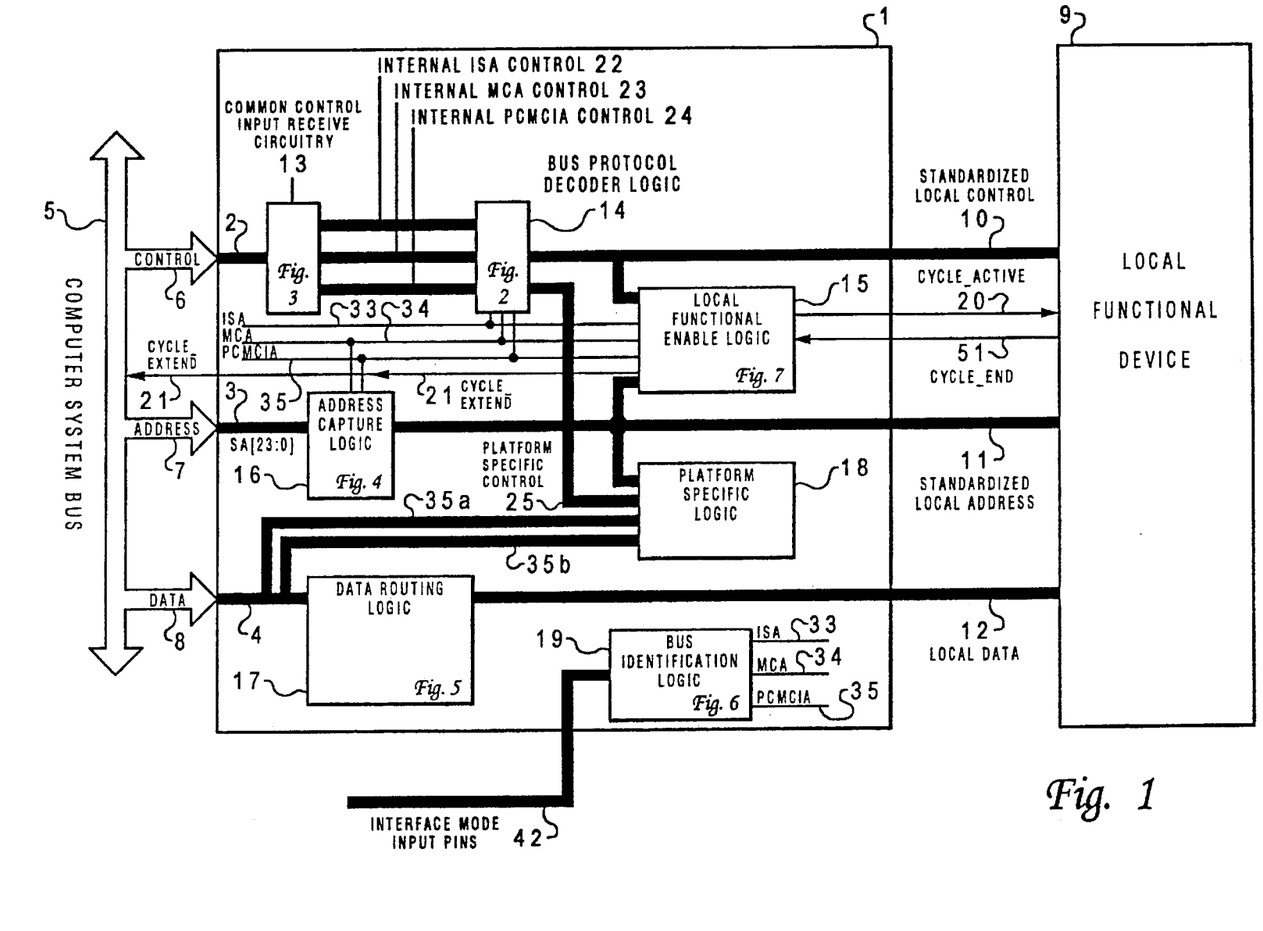
FIG. 1 is a representation of an overall system diagram.

Referring to FIG. 1, it can be seen that the embodiment of the invention, adapter 1 illustrated is composed of interface lines (2), (3), (4) for connection to a computer system bus (5) consisting of control (6), Address (7) and Data (8) portions. The adapter (1) is intended as an interface from a computer system to a local functional device (9) the adapter provides a local bus consisting of Local Control (10), Local Address (11) and Local Data buses (12), which connect to a Local Functional device (9).

The adapter (1) can be seen to be further composed of Common Control Input Receive Circuitry (13), Bus Protocol Decoder Logic (14), Local Functional Enable Logic (15), Address Capture Logic (16), Data Routing Logic (17), Platform Specific Logic (18) and Bus Identifier Logic (19).

The current embodiment of the invention is designed to conform to any one of ISA, Microchannel or PCMCIA bus specifications. The embodiment illustrated is an implementation of a Memory and I/O Slave to the computer system to which it is connected. Accesses to the adapter (1) are passed to the local functional device (9). Those skilled in the art will recognize that support for more comprehensive use of system capabilities (such as DMA and interrupts) would be possible by extension of the principles defined herein.

A summary of the operation of the current invention is as follows. When bus cycles are executed on the computer system bus, the adapter (1) determines the validity of the current bus cycle as it pertains to the local function being supported. This involves for one thing decoding the input control signals to determine the cycle type being performed, for example memory read, memory write, I/O read or I/O write. In the case of memory accesses, any necessary decode of the System Address (7) is done to determine if the address range being accessed by the system is in the range allocated to the local functional device (9). In the case of input/output (I/O) accesses, the adapter circuitry decodes the system address to determine if the I/O port being accessed is allocated to the local functional device. When a valid address is detected on the System Address while a valid cycle type is detected, the adapter (1) will activate the CYCLE_ACTIVE signal on cycle active line (20) to the local functional device (9) accompanied by the standardized local control signals on local control bus (10) and the standardized local address on local address bus (11). The adapter (1) will also generate the necessary feedback signals to the computer host system as required by the specific system bus being interfaced to. One important such feedback signal is the CYCLE_EXTEND signal on line (21) (in ISA and Microchannel this is IOCHRDY and in PCMCIA this is WAIT-) which is used by the adapter (1) to extend system bus cycles until the local functional device (9) has completed the requested operation or transaction (indicates by a CYCLE_END signal on CYCLE_END line (51) generated by the local function). It will be clear to those skilled in the art, that the function of the CYCLE_END signal would not be necessary in the event that the Local Functional device (9) is a zero wait state device on all platforms (in other words capable of meeting the fastest system cycle times). In the event however that the local functional device (9) may require variable time to respond to system accesses (for example in the event of a local function that implements a form of local direct memory access or DMA) the CYCLE_END signal is used by the local functional device (9) to indicate when it is ready for the current system cycle to terminate and hence complete the operation. Consider a system access initiated while the local function was performing a local Direct Memory Access (DMA) operation, for example, the completion of the system cycle would have to be delayed until the local DMA operation had completed and the local resources could be granted to the host for the pending cycle.

As much as the current embodiment strives to unify the interface to the three system busses, when there are platform specific requirements to be met to maintain specification compliance, then platform specific logic, eg. logic (18) will be necessary.

For example, the Microchannel architecture specifies the use of Programmable Option Select (POS) Registers for expansion card resource allocation, (eg. memory or I/O address ranges) which those skilled in the art of Microchannel adapter design will be familiar with both in their implementation and application.

In the ISA architecture, resource allocation is typically performed by on board DIP switches which connect to an ISA interface as is the case in the present embodiment. Those skilled in the art of ISA Adapter design will be familiar with variations of this technique and will be familiar with their application.

Figure 3:
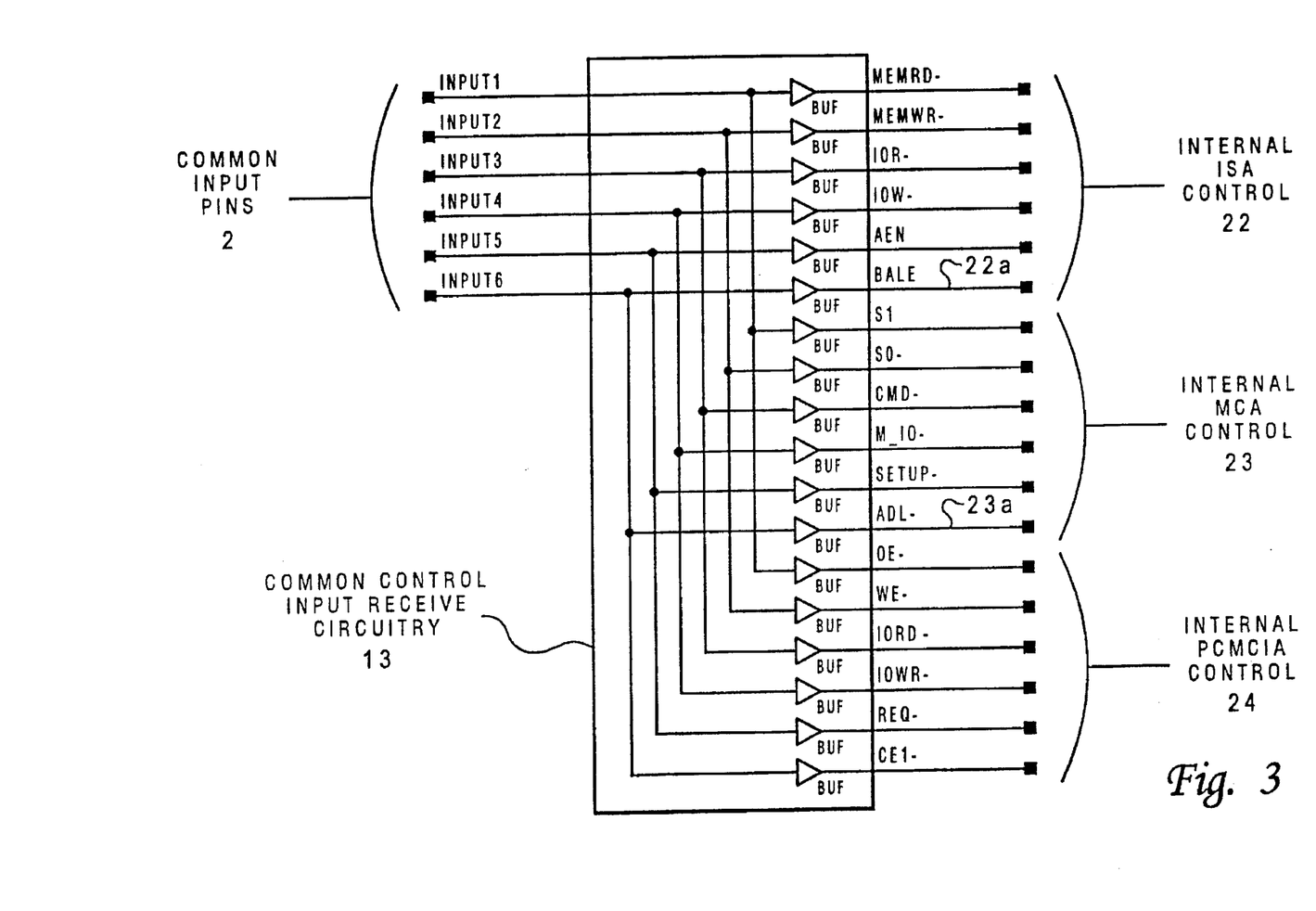
FIG. 3 is a representation of common input receive circuitry.

In the PCMCIA architecture, Attribute memory is in a unique and mandatory memory space (if PCMCIA specification compliance is desired) used to control resource allocation and some generic PCMCIA functions. Those familiar with the PCMCIA Architecture will be familiar with implementations and applications of the PCMCIA Configuration Registers and the Card Information Structure (CIS) of Attribute Memory. With reference to FIG. 3, it can be seen how common control input receive circuitry (13) which receives host control signals via input pins (or bus lines) 2 (Input 1, Input 2, Input 3, Input 4, Input 5 and Input 6) is used to generate three sets of signals, namely, Internal ISA Control (22), Internal MCA Control (23) and Internal PCMCIA Control (24).

Figure 2A:
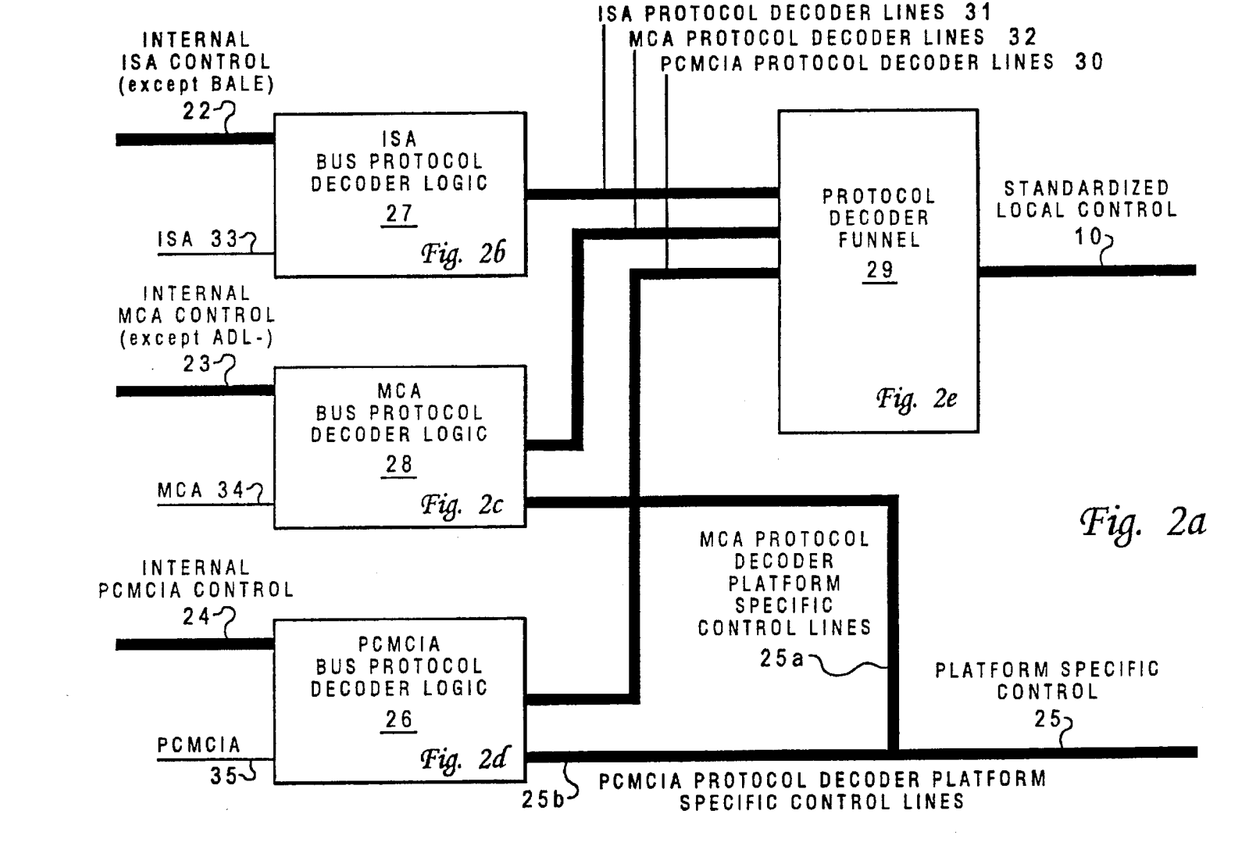

With reference to FIG. 2a, the Bus Protocol Decoder Logic (14) is seen taking Internal PCMCIA Control (24), Internal ISA Control (22) and Internal MCA Control (23) as its inputs and producing Standardized Local Control (10) and Platform Specific Control (25) as its outputs. The Bus Protocol Decoder Logic can be seen as comprising PCMCIA Bus Protocol Decoder Logic (26), MCA Bus Protocol Decoder Logic (28), ISA Bus Protocol Decoder Logic (27) and a Protocol Decoder Funnel (29).

The ISA Bus Protocol Decoder Logic (27) uses Internal ISA control (22) as inputs and produce output on lines (31). FIG. 2b illustrates the details of the ISA Bus Protocol Decoder Logic (27).

Figure 2C:
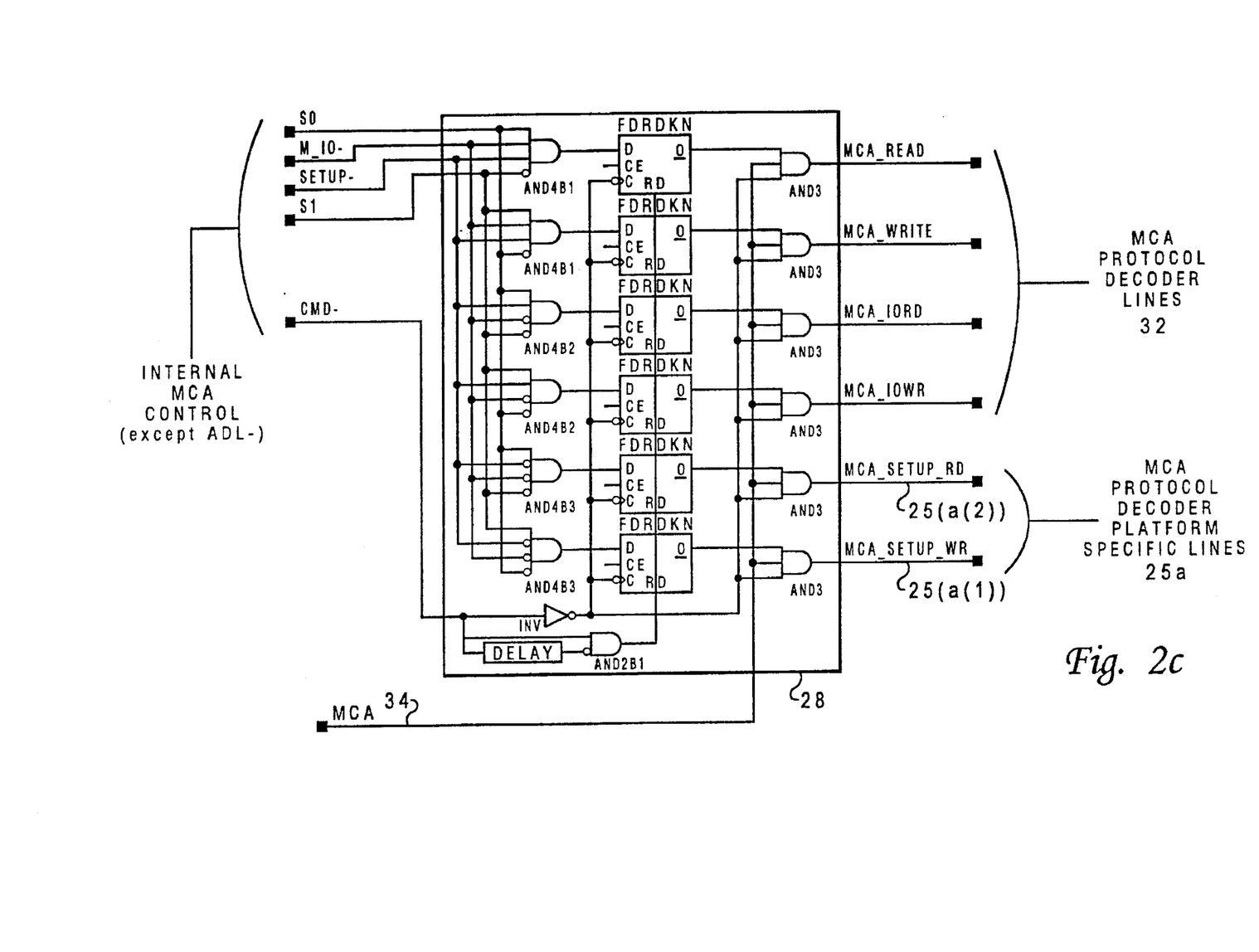

With further reference to FIG. 2a, the MCA Bus Protocol Decoder Logic (28) can be seen to take input on lines (23) and produce output on lines (32) and (25b). FIG. 2c illustrates the details of (32) and (25b) as outputs. FIG. 2c illustrates the details of the MCA Bus Protocol Decoder Logic (28).

Figure 2D:
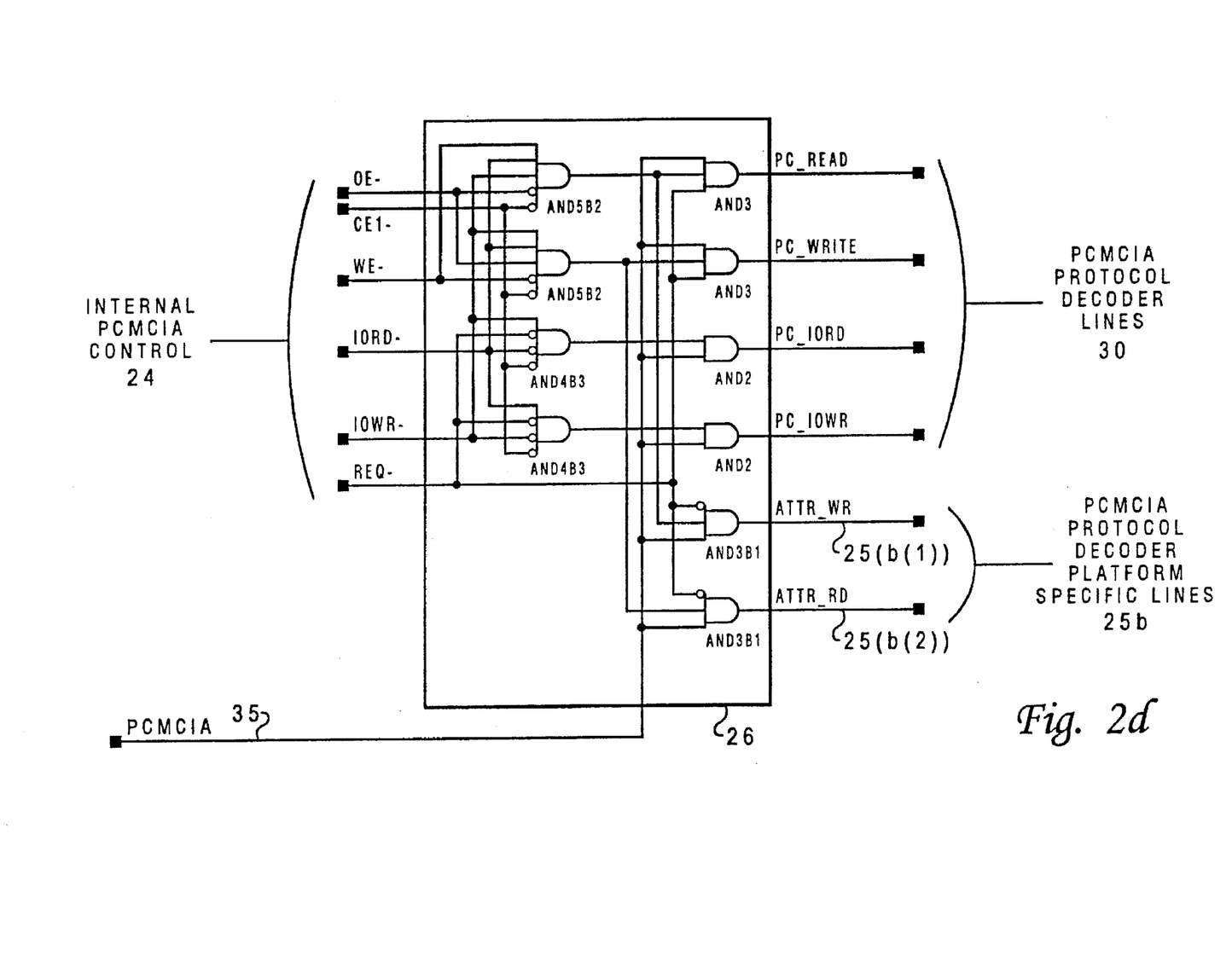

With further reference to FIG. 2a, the PCMCIA Bus Protocol Decoder Logic (26) can be seen use lines (24) as inputs and produce outputs on lines (30) and (25a). FIG. 2d illustrates the details of the PCMCIA Bus Protocol Decoder Logic (26).

Figure 2E:
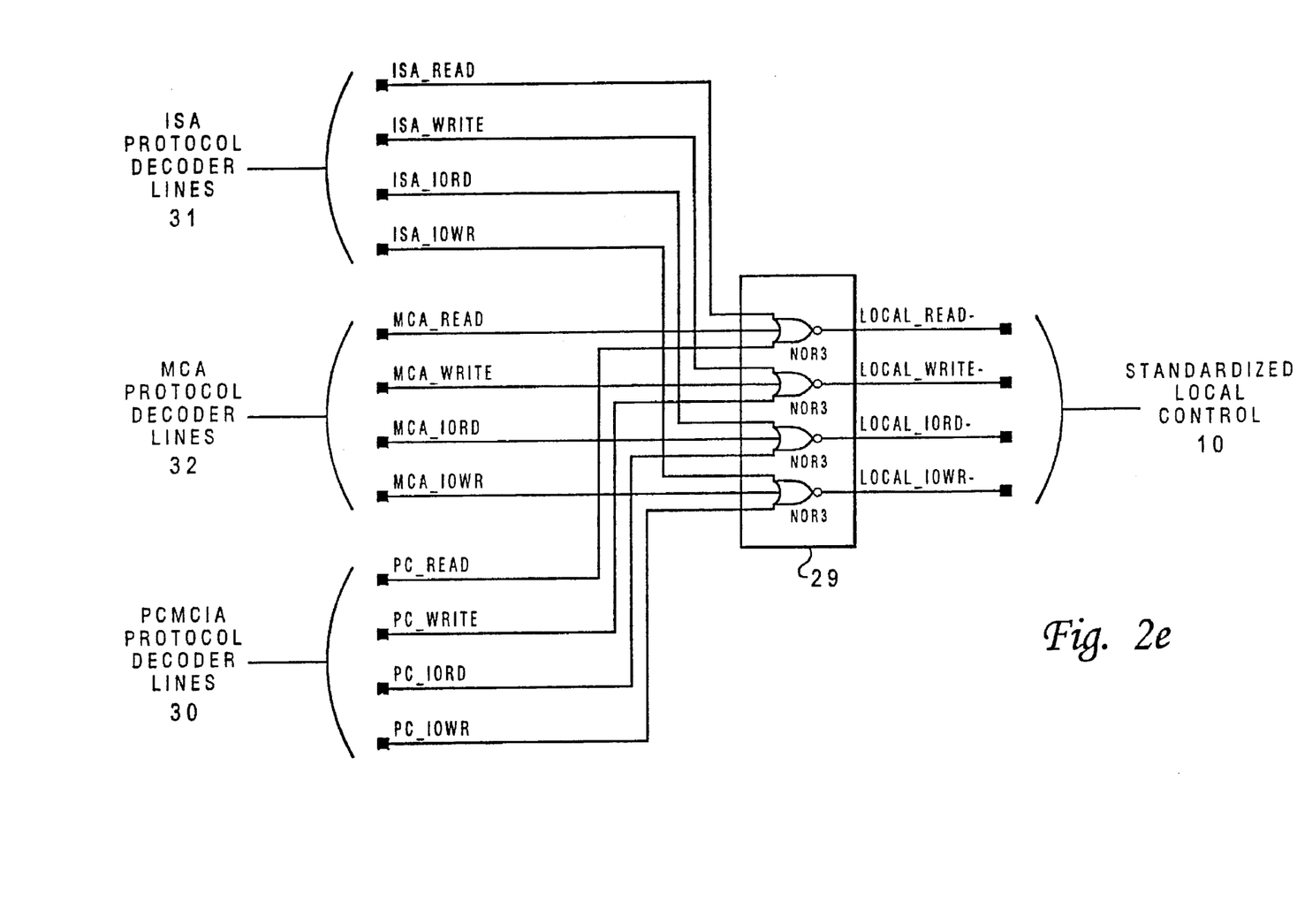

With further reference to FIG. 2a, the Protocol Decoder Funnel (29) can be seen to use lines 30, 31 and 32 as inputs and produce outputs on the Standardized Local Control line (10). FIG. 2e illustrates the details of the Protocol Decoder Funnel.

Again referring to FIG. 2a, the Platform Specific Control Lines (25) can be seen to be the combination of the PCMCIA Protocol Decoder Platform Specific Lines (25a) and the MCA Protocol Decoder Platform Specific Lines (25b).

The functioning of the bus protocol decoders will be readily apparent to those familiar with ISA, MCA and PCMCIA bus architectures.

With reference to FIG. 2b, the generation by ISA protocol decoder (27) of ISA output ISA protocol decoder signals ISA_READ, ISA_WRITE, ISA_IORD and ISA_IOWR are mutually exclusive by the specification of the ISA bus in that only one of MEMRD-, MEMWR-, IORD- or IOWR-will be active during a slave cycle. One of these four output signals will be asserted during ISA slave memory read/write operations and slave I/O read/write operations.

Referring to FIG. 2e; in the event that one of these ISA output signals become active, a local control signal (LOCAL_READ-, LOCAL_WRITE-, LOCAL_IORD- or LOCAL_IOWR-) will be generated by the protocol decoder funnel (29) on local control line 10 at the output of the corresponding three input NOR gate. It should be noted that for activation, for a ISA output on bus (31) input bus ISA must be high indicating adapter (1) is in ISA mode of operation as a result of input from bus identification logic (19). In the event that ISA line 33 is low, the four signals ISA_READ, ISA_WRITE, ISA_IORD and ISA_IOWR will be inactive or low hence not able to activate any of LOC_READ-, LOC_WRITE-, LOC_IORD- and LOC IOWR-.

In FIGS. 2d and 2e are depicted the corresponding PCMCIA protocol decoder (26) and Microchannel protocol decoder 28. As was the case with the ISA protocol decoder (27), the assertion of any of the MCA decoder output (32) signals or PCMCIA output decoder (30) signals requires the corresponding mode signals MCA or PCMCIA from the bus identifier logic (19) to be active respectively. It should also be noted that the Microchannel protocol decoder (28) produces two specific signals, MCA_SETUP_WR (25(b(1))) and MCA_SETUP_RD (25(b(2))) which will only be generated during system configuration operations in a Microchannel system while accessing Programmable Option Select (POS) registers which would be implemented in the platform specific logic 18 (not illustrated). Likewise, the PCMCIA protocol decoder (26) produces two specific signals, ATTR_RD (25(a(2))) and ATTR_WR (25(a(1))) which are generated during system accesses to PCMCIA Attribute memory space. These platform specific control signals (25(1(1)), 25(a(2)), 25(b(1)), 25(b(2))) are used by the Platform Specific Control logic (18) in the current embodiment. For both the Microchannel protocol decoder (28) and the PCMCIA protocol decoder (26), all of the outputs are mutually exclusive, meaning that only one output can be logically active at the same time.

Figure 4:
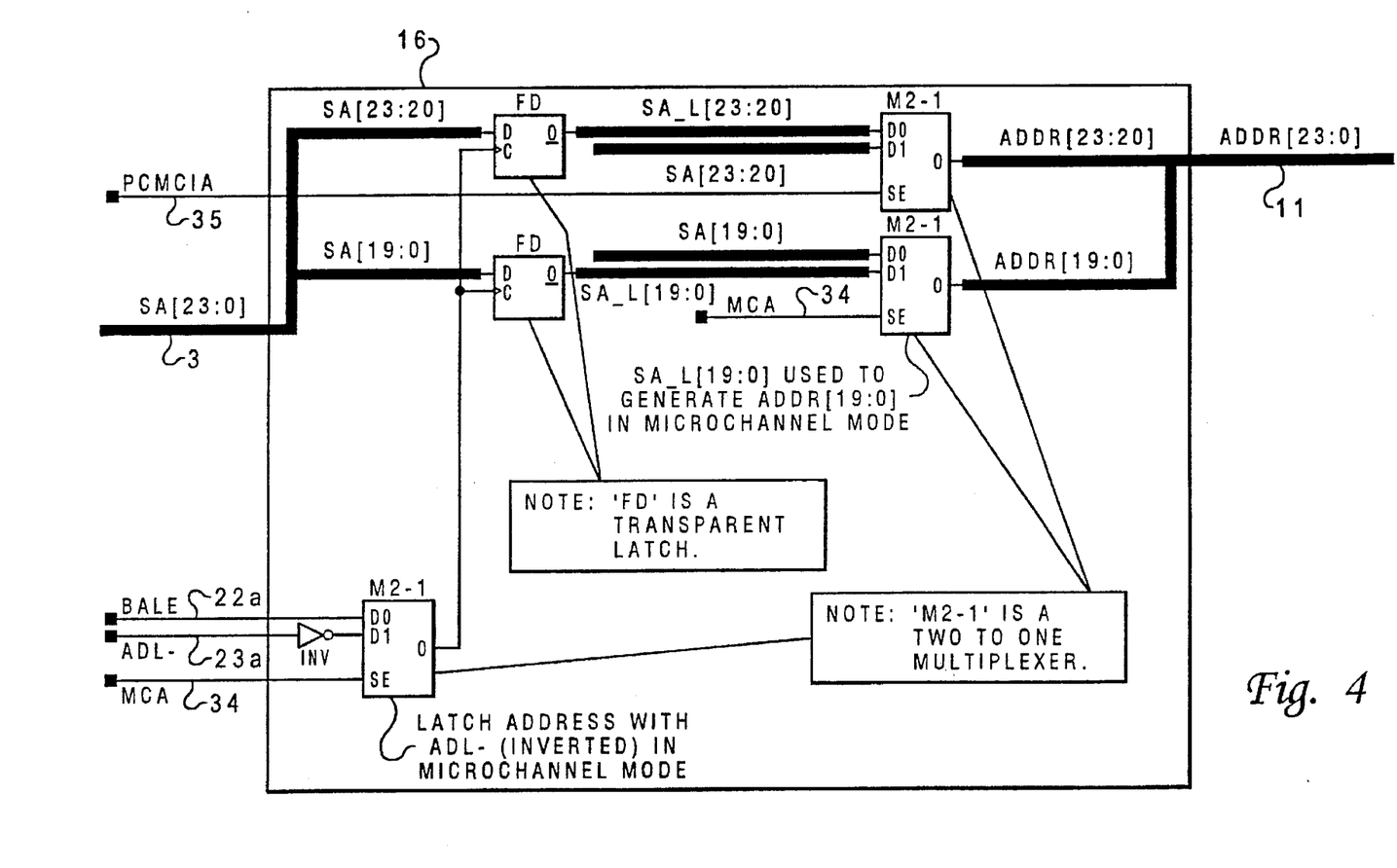
FIG. 4 is a representation of system address capture logic.

With reference to FIG. 4 showing the address capture logic (16), the system address produced by the various system busses are captured differently.

PCMCIA addresses are held stable by a computer which uses PCMCIA architecture during each transaction and hence need not be latched internally.

A 16 bit ISA bus uses 24 bit addresses (System Addresses 0–23).

System addresses 0–19 (SA[19:0]) are provided across a standard 8-bit ISA connector (not shown) and are stable throughout system accesses. ISA system addresses 20–23 (LA[23:20]) are not stable and must be latched locally by the System to Local Interface adapter (1).

Microchannel architecture uses system addresses 0–23 ([23:0]) all of which are not stable and must be latched by the System to Local Interface adapter (1).

ISA addresses are latched using the ISA bus signal BALE (22a) (Bus Address Latch Enable), and Microchannel addresses are latched by the MCA bus signal ADL- (23a) (Address Latch). The active signal (BALE or ADL-) and the proper level are selected by the address capture logic (16) based on the state of the MCA output from bus identification logic (19) according to the architecture being interfaced to (ISA (uses BALE) or MCA (uses ADL-)). The Address Capture Logic (19) also selects which address to use, the unlatched addresses SA[23:0] for PCMCIA, the latched address SA_L[23:0] for MCA or the combination address (latched SA_L[23:20], unlatched SA[19:0]) for ISA to generate ADDR[23:0] which may be driven as required by the local functional device (9) onto the Local Address bus 11 to the local functional device (9).

Figure 5:
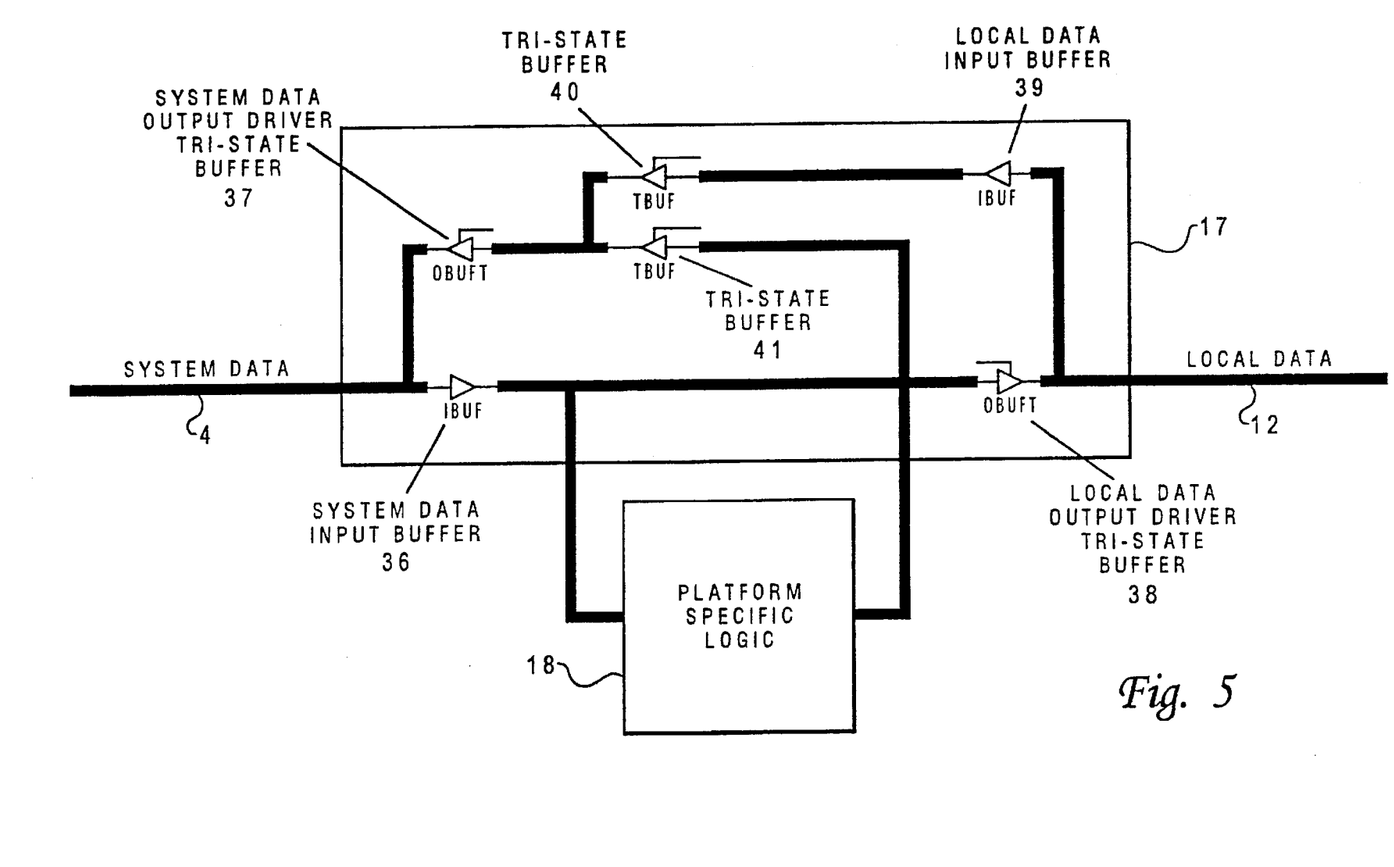
FIG. 5 is a representation of data routing logic.

With reference to FIG. 5, it can be observed that the data routing logic (17) connects system to local data through input buffer (36) and local data output driver tri-state buffer (38); and local data to system transfer using local data input buffer (39) through tristate buffer (40) through system data output driver tristate buffer (37). The process of transferring data to or from the system bus (5) is as follows: System data is received at the System Data pins (2) of the adapter (1) and is routed through the Data Routing Logic (17) to the Local Data bus (12) in the case of a write operation, or Local data is received at the Local Data lines (12) of the adapter (1) and is routed through the Data Routing Logic (17) and driven onto the System Data bus (5) in the case of a read operation. Platform specific operations occur independently of the Local Data Bus (12) and data may be exchanged with the system bus 5.

Data can be sent to the platform specific logic (18) through system data input buffer (36). Data can be transferred from platform specific logic (18) to the system data bus (8) through tristate buffer (41) and system data output driver tristate buffer (37).

The tristate drivers (37), and (40) are enabled by system reads of data from the local data bus (12).

Drivers (37), and (40) are enabled during system reads of platform specific data.

Driver (38) is enabled on system writes to the local data bus.

Figure 6:
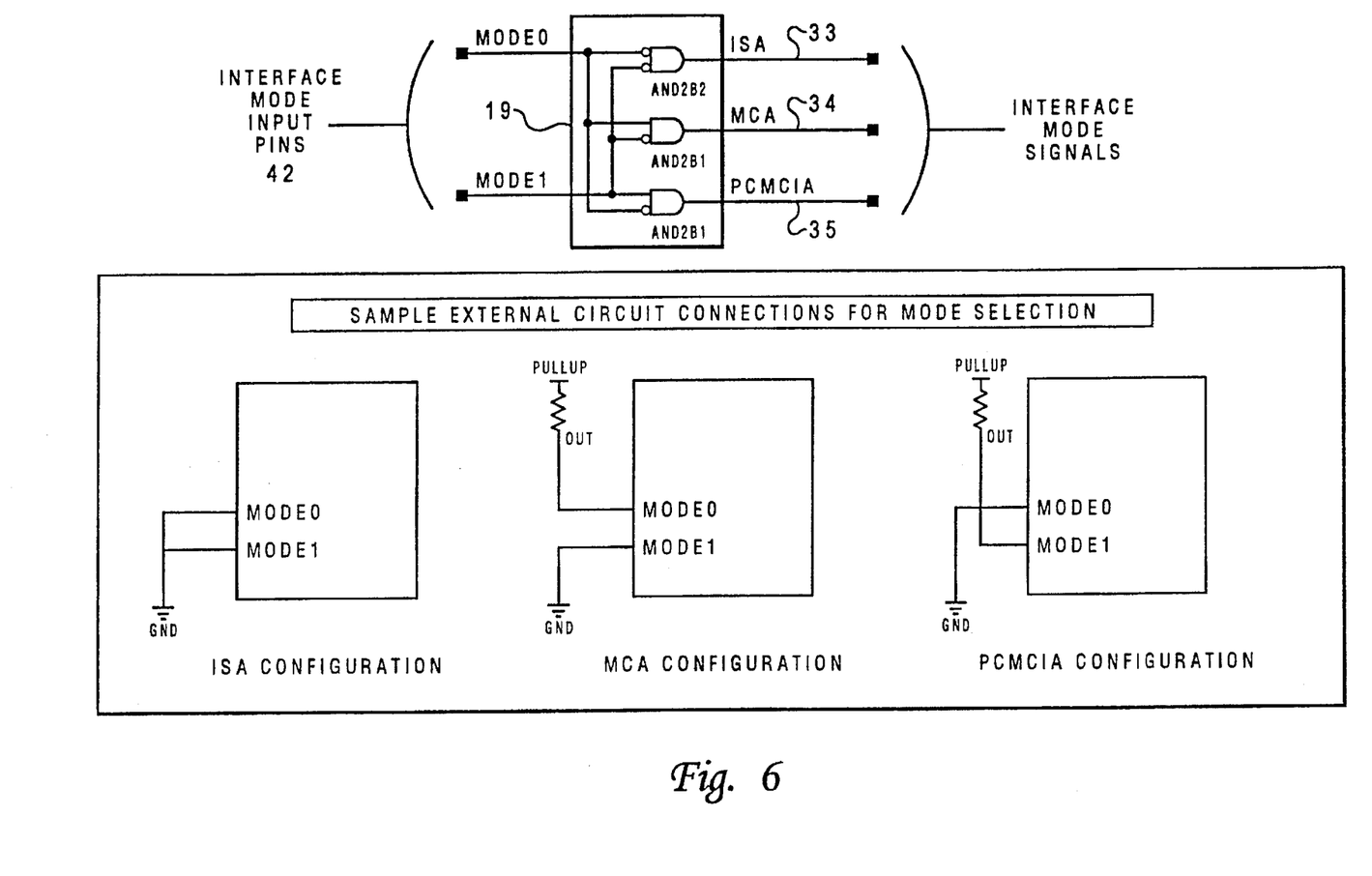
FIG. 6 is a representation of mode selection logic (bus identifier).

FIG. 6 illustrates the bus identification logic (19) which uses the input condition to mode pins (42) to generate the ISA, MCA and PCMCIA signals used throughout the adapter (1). It can be seen that these signals are mutually exclusive in that only one can be high at any point in time.

Figure 7:
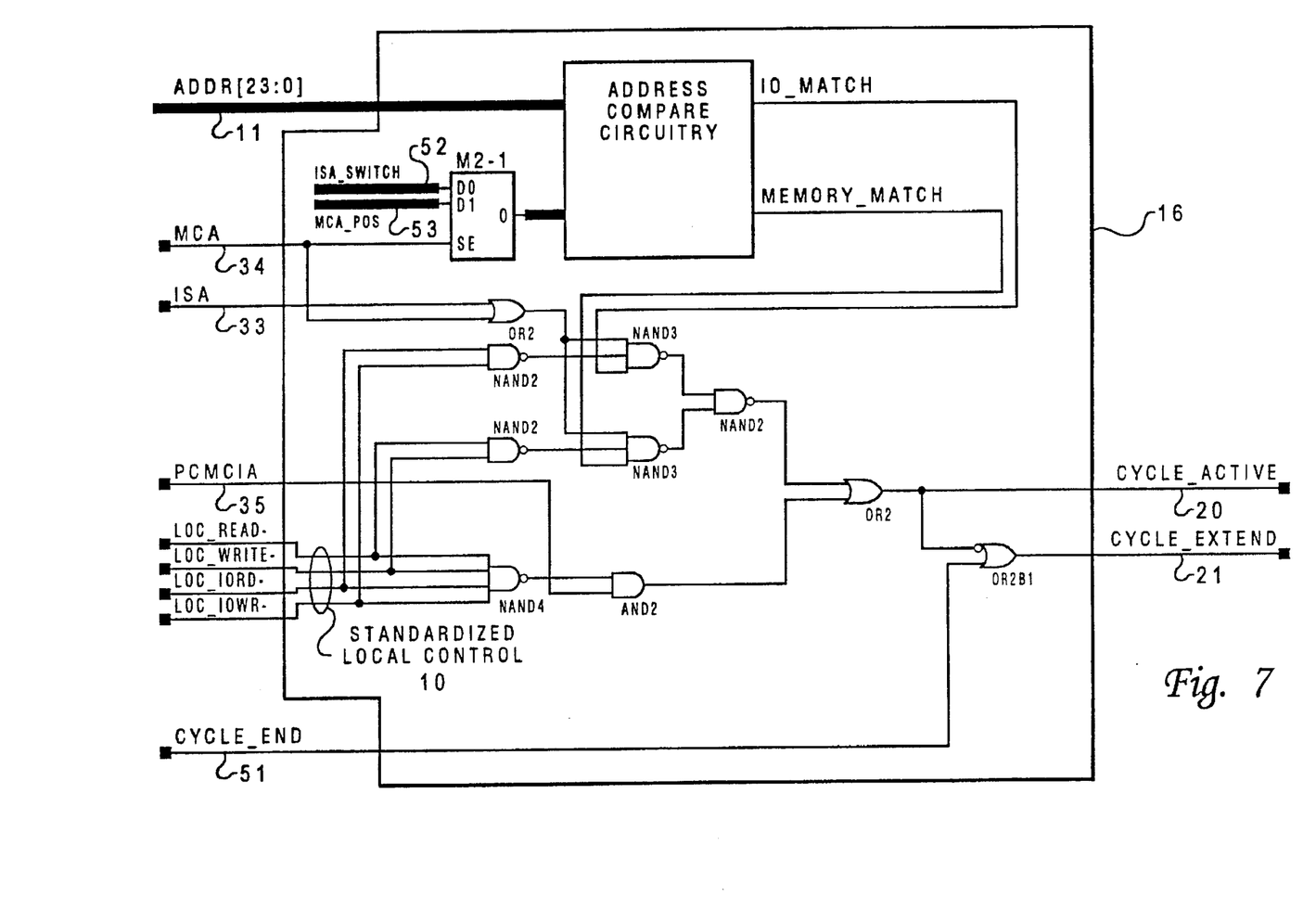
FIG. 7 is a representation system access detect logic (local functional enable logic).

FIG. 7 illustrates the decode that is performed on the local control signals (LOC_READ-, LOC_WRITE-, LOC_IORD- and LOC_IOWR-) on local control bus (10) in conjunction with the captured address (ADDR[23:0]) to detect the occurrence of a valid system cycle and to generate the corresponding CYCLE_EXTEND and CYCLE_ACTIVE signals. The Captured System Address (ADDR [23:07]) is compared to the supported address ranges for Memory and I/O in both ISA and Microchannel architectures. The difference between the two is the source of the supported address range. In the case of operation in ISA mode, the settings of external switches (ISA_SWITCH 52 Bus on FIG. 7) may be used to position an window (eg. 8 kilobytes) of accessible local memory in the system address range HEX C0000-HEX DFFFF (commonly referred to as the C and D segments) on one of 16 possible 8K boundaries in that range; ie: HEX C0000, HEX C2000, HEX C4000 . . . where a hexadecimal increment of HEX 2000 equates to an 8K step in memory space. The same operation is performed in the Microchannel architecture except that the allocated address range is determined according to the contents of MCA_POS (53), the Programmable Option Select (POS) registers in the Platform Specific Logic (18). In the current embodiment, this address range positions an 8 kilobyte window on one of 16 possible 8k boundaries in the C and D segments.

In PCMCIA architecture, this address validation operation is not required. In the case of I/O accesses, the same approach is used as above to determine if the System Address being presented falls within the active 16 byte block of I/O space. The active block of I/O space in the current embodiment is one of 8 16-byte boundaries in the range HEX 300, HEX 310, HEX 320, HEX 330, HEX 340, HEX 350, HEX 360 or HEX 370. Again, the active setting is determined in ISA by DIP switch settings (eg. external to the Adapter (1)) and in Microchannel by the settings of Programmable Option Select registers. The CYCLE_ACTIVE signal is active as long as a valid system cycle condition is detected. The CYCLE_EXTEND signal is asserted as feedback to the system in the presence of CYCLE_ACTIVE and the absence of CYCLE_END. Those skilled in the art will observe that zero wait state operation of the interface is capable by forcing the CYCLE_END signal to the active state at all times and hence eliminating the assertion of CYCLE_EXTEND to the system.

The Platform Specific Logic (18) indicated in FIG. 1 and FIG. 5 (the data routing logic) is used to support platform specific requirements such as the implementation of the Microchannel POS registers, PCMCIA Attribute Memory and the current embodiments usage of external DIP switches to determine the active system memory and I/O ranges in an ISA system. The details of the implementation of the Platform Specific Logic are not described as the contents of this logic should conform to the respective bus specifications which are known to those skilled in the art. Access to the Platform Specific Logic (18) may be controlled by the Platform Specific Control signals (25) and a decode of the captured system address lines (11) where necessary. The detailed implementation of Platform Specific Logic (18) is dependent upon the sophistication desired of the adapter's capabilities.

The invention herein is not limited to the specific embodiment shown. Many modifications may be made without departing from the spirit and scope of the invention.

What is claimed is:

1. A multiple bus interface adapter for connection to the bus of a data processing device, the multiple bus interface adapter comprising:
   common interface means for connection to any of several data processing device bus architectures for operation therewith, wherein said common interface means includes;
   (a) control interface means for accepting control signals from the bus of said data processing device;
   (b) address interface means for accepting address signals from said data processing device;
   (c) data interface means for accepting data signals from said data processing device;
   bus identifier means for identifying the bus architecture of said data processing device;
   bus protocol decoder means responsive to said bus identifier means, said bus protocol decoder means deriving its input from said control interface means and being adapted to produce as an output standardized local control signals, wherein said standardized local control signals are derived from control signals of said data processing device and are usable by a plurality of local functional devices; and
   a standardized local control signal output connectable to a selected local functional device among said plurality of local functional devices.

2. The multiple bus interface adapter of claim 1, wherein the common interface means receives input signals from said data processing device and sends output signals to said data processing device.

3. The multiple bus interface adapter of claim 1, wherein one or more of said control, address, and data interface means are adapted to receive input signals from or send output signals to said data processing device.

4. The multiple bus interface adapter of claim 1, wherein an output interface means is provided to send output signals to said data processing device.

5. The multiple bus interface adapter of claim 1, wherein the common interface means comprises a set of common lines to be used for connection to a bus of any one of said several data processing device bus architectures.

6. The multiple bus interface adapter of claim 5, wherein said control interface means comprises a set of common input lines to be used for connection to a bus of any of said several data processing device bus architectures.

7. The multiple bus interface adapter of claims 5 or 6, wherein said several data processing device bus architectures include data processing device bus architectures selected from ISA, PCMCIA, and Microchannel architectures.

8. The multiple bus interface adapter of claim 6, further including address capture logic means coupled to said address interface means, the address capture logic means having transparent latches enabled by control signals from said control interface means to provide a standardized local address for said selected local functional device.

9. The multiple bus interface adapter of claim 8, further including local functional enable logic responsive to said standardized local address to provide an activation signal to said selected local functional device.

10. The multiple bus interface adapter of claim 9, wherein said local functional enable logic provides feedback to said data processing device.

11. The multiple bus interface adapter of claim 10, wherein said feedback includes an acknowledgment signal indicative of receipt of said standardized local address and a corresponding standardized local control signal.

12. The multiple bus interface adapter of claim 11, wherein said acknowledgment signal includes an acknowledgment signal from said selected local functional device signifying completion of a function initiated by said standardized local control and address signals.

13. The multiple bus interface adapter of claim 6, wherein said bus identifier means is adapted to convey bus identification to said selected local functional device.

14. The multiple bus interface adapter of claim 1, wherein said bus protocol decoder includes means responsive to said bus identifier means for deriving protocol specific control signals from control signals received from said control interface means.

15. The multiple bus interface adapter of claim 1, comprising an individual module, said common interface means comprising externally available lines for connection to a bus connector.

16. An option module comprising a bus connector, a multiple bus interface adapter according to claim 1 connected to said bus connector, and a local functional device connected to said multiple bus interface adapter.

17. A multiple bus interface adapter for connection to a bus of a data processing device, the multiple bus interface adapter comprising:
   common interface means for connection to any of several data processing device bus architectures for operation therewith, wherein said common interface means includes control interface means for accepting control signals from the bus of said data processing device;
   bus identifier means for identifying the bus architecture of said data processing device;

bus protocol decoder means responsive to said bus identifier means, said bus protocol decoder means deriving its input from said control interface means and being adapted to produce as an output standardized local control signals, wherein said standardized local control signals are derived from said control signals of said data processing device and are usable by a plurality of local functional devices; and a standardized local control signal output connectable to a selected local functional device among said plurality of local functional devices.

* * * * *